(12) United States Patent
Hunwick (10) Patent No.: US 12,409,413 B2
(45) Date of Patent: Sep. 9, 2025

(54) CAPTURE AND STORAGE OF ATMOSPHERIC CARBON

(71) Applicant: Richard James Hunwick, Waterford (AU)

(72) Inventor: Richard James Hunwick, Waterford (AU)

(*) Notice: Subject to any disclaimer, the term of this patent is extended or adjusted under 35 U.S.C. 154(b) by 561 days.

(21) Appl. No.: 17/772,609

(22) PCT Filed: Nov. 2, 2020

(86) PCT No.: PCT/AU2020/051192
§ 371 (c)(1),
(2) Date: Apr. 28, 2022

(87) PCT Pub. No.: WO2021/081605
PCT Pub. Date: May 6, 2021

(65) Prior Publication Data
US 2022/0297059 A1    Sep. 22, 2022

(30) Foreign Application Priority Data
Nov. 1, 2019  (AU) .................... 2019904129

(51) Int. Cl.
*B01D 53/78*    (2006.01)
*B01D 53/62*    (2006.01)
*B01D 53/96*    (2006.01)

(52) U.S. Cl.
CPC ............. *B01D 53/78* (2013.01); *B01D 53/62* (2013.01); *B01D 53/96* (2013.01);
(Continued)

(58) Field of Classification Search
CPC ........ B01D 53/62; B01D 53/78; B01D 53/96; C07C 7/00
See application file for complete search history.

(56) References Cited

U.S. PATENT DOCUMENTS 3,894,393 A    7/1975   Carlson
5,284,628 A    2/1994   Prueitt
(Continued)

FOREIGN PATENT DOCUMENTS

WO    WO 2010/088738       8/2010
WO    WO 2010/107974 A1    9/2010
(Continued)

OTHER PUBLICATIONS

A. Sanna et al., A review of mineral carbonation technologies to sequester $CO_2$, Chem. Soc. Rev., 2014, 43, 8049.
(Continued)

*Primary Examiner* — Sharon Pregler
(74) *Attorney, Agent, or Firm* — Ballard Spahr LLP (57) ABSTRACT

Described is a method and system for sequestration of carbon dioxide from atmospheric air. The method and system involves the enabling of atmospheric air to pass into an upper end of an elongate hollow tower. An aqueous solution is charged (e.g. via a distributor) so as to mix with the atmospheric air within and adjacent to the tower upper end in a manner such that the air is cooled by evaporative cooling. As a result, the mixture passes downwards as a stream through the hollow tower. The aqueous solution includes a reagent added thereto that reacts with the carbon dioxide to form a compound in the solution to thereby sequester the carbon dioxide from the atmospheric air. The method and system also can generate electricity from the downwards stream that is passing through the hollow tower.

19 Claims, 5 Drawing Sheets

(52) U.S. Cl.
CPC ............... *B01D 2251/2062* (2013.01); *B01D 2257/504* (2013.01); *B01D 2258/06* (2013.01); *B01D 2259/124* (2013.01)

(56) References Cited

U.S. PATENT DOCUMENTS

| | | | |
|---|---|---|---|
| 6,510,687 B1 | 1/2003 | Zaslavsky et al. | |
| 6,647,717 B2 | 11/2003 | Zaslavsky et al. | |
| 2009/0081096 A1* | 3/2009 | Pellegrin | B01D 53/62 423/232 |
| 2011/0038774 A1* | 2/2011 | Zhong | C01B 7/055 423/234 |
| 2011/0126715 A1 | 6/2011 | Kimura | |
| 2011/0171105 A1 | 7/2011 | Sevier | |

FOREIGN PATENT DOCUMENTS

| | | |
|---|---|---|
| WO | WO 2017/106293 A2 | 6/2017 |
| WO | WO 2018/182506 | 10/2018 |

OTHER PUBLICATIONS

Pagan-Quinones, Shade Balls or Floating Solar Panels? Accessed Apr. 21, 2022, URL: http://latinamericanscience.org/shadeballs-or-floating-solar.

International Search Report and Written Opinion mailed on Sep. 22, 2020 by the International Searching Authority for International Application No. PCT/AU2020/051192 filed on Nov. 1, 2019 and published as WO 2021/081605 (Applicant—Richard James Hunwick) (18 pages).

International Preliminary Report on Patentability issued Sep. 28, 2021, by the International Searching Authority for International Application No. PCT/AU2020/051192 filed on Nov. 1, 2019 and published as WO 2021/081605 (Applicant—Richard James Hunwick) (79 pages).

* cited by examiner

CAPTURE AND STORAGE OF ATMOSPHERIC CARBON

CROSS-REFERENCE TO RELATED APPLICATIONS

This application is a U.S. National Phase Application of International Application No. PCT/AU2020/051192, filed Nov. 2, 2020, which claims priority to Australian Application No. 2019904129, filed Nov. 1, 2019, each of which are hereby incorporated by reference in their entirety.

TECHNICAL FIELD

A method and system are disclosed for capturing carbon dioxide from the atmosphere. At the same time, the method and system can be used to generate electrical energy (e.g. electricity).

BACKGROUND ART

Internationally, there are imperatives to reduce carbon dioxide emissions to the atmosphere, as well as to reduce current levels of carbon dioxide in the atmosphere, with both efforts directed to help minimise the effects of global warming. To meet such goals, efforts to minimize carbon dioxide emissions at their sources must be joined by efforts to remove the gas from the broader atmosphere and store it permanently.

Carbon dioxide sinks exist naturally, including the weathering of silicate rocks to form carbonates, and the world's oceans. Plants are also an effective form of carbon dioxide sink and use photosynthesis to remove carbon from the atmosphere by incorporating it into biomass. However, these naturally occurring sinks are not capable of effectively keeping up with the vast quantities of carbon dioxide currently being released from anthropogenic sources.

The task implied is immense, therefore there must be a collective response if significant offsetting impacts are to be made. The costs will run into the hundreds of billions of dollars, raising the question of where the funds required will come from. Clearly, if the responses can strip carbon dioxide from the atmosphere while generating net revenues adequate to cover the necessary investment, the challenge becomes of a different, less daunting order.

Since carbon dioxide is present in the atmosphere at concentrations of only around 400 parts per million, systems that seek to remove carbon dioxide from the broader atmosphere must be capable of handling immense quantities of air. Such handling systems must also be capable of capturing the carbon dioxide from the vast air quantities passing through such systems and then storing it permanently.

US 2011/0171105 discloses a plant for capturing carbon dioxide from the atmosphere. To absorb carbon dioxide present in atmospheric air, the plant uses a calcium sulphate solution mixed with ammonia that is sparged into the atmospheric air that passes into the top region of an enclosure. Ammonium sulphate solution is captured in a reservoir located at a base of the enclosure. The scale and teaching of US 2011/0171105 is such that there is and could be no generation of energy, such as electrical energy.

US 2009/0081096 discloses a $CO_2$ scrubber in the form of a stainless steel reaction-chamber cylinder. A froth of calcium hydroxide solution and atmospheric air is generated by a froth generator located at a top of the reaction-chamber cylinder. This froth is caused to pass down through the reaction-chamber cylinder to a dewatering chamber, where a calcium carbonate solution is separated from the air. The air scrubbed of $CO_2$ is vented to atmosphere via an exhaust stack. Again, the scale and teaching of US 2009/0081096 is such that there is and could be no generation of energy, such as electrical energy.

The above references to the background art do not constitute an admission that such art forms a part of the common and/or general knowledge of a person of ordinary skill in the art. The above references are also not intended to limit the application of the method and system as disclosed herein.

SUMMARY OF THE DISCLOSURE

Disclosed herein is a method and system for sequestration of carbon dioxide from atmospheric air. The method and system can, at the same time, be configured to generate electrical energy—e.g. electricity. The electricity generated may be in excess of that required to power the overall method and system.

In accordance with the method and system as disclosed herein, atmospheric air is enabled to pass into an upper end of an elongate hollow tower. An aqueous solution can be charged within and adjacent to the tower upper end. The aqueous solution can comprise a reagent added thereto that reacts with the carbon dioxide to form a compound in the solution to thereby sequester the carbon dioxide from the atmospheric air. The aqueous solution comprising the reagent can be charged so as to mix with the atmospheric air in a manner such that the air is cooled by evaporative cooling. As a result of such evaporative cooling, the mixture can pass downwards as a stream through the hollow tower. Electricity can be generated from the downwards stream that is passing through the hollow tower. In this regard, the hollow tower can be sized and located such that the downwards stream can possess significant kinetic energy (e.g. sufficient to power gas turbines).

The method and system have been developed to handle vast quantities of air, and to capture the carbon dioxide present in such vast air quantities, with the option of then storing the captured carbon permanently. Because the method and system as disclosed herein seek to capture as much of the carbon dioxide present in atmospheric air as possible, vast quantities of air are required to be processed (i.e. due to the relatively low concentrations of carbon dioxide in atmospheric air). As such, the method and system ultimately envisage multiple facilities deployed on a large scale.

In the method and system as disclosed herein, typically the hollow tower is a very tall tower (i.e. as set forth below). The reagent (e.g. in aqueous solution) is mixed with the atmospheric air passing through the hollow tower, and is typically charged adjacent to an open upper end of the tower. Typically, a reagent is selected that is reactive with the carbon dioxide in the air to produce a compound that comprises the carbon dioxide, thereby sequestering or 'scrubbing' the carbon dioxide from the air. As necessary, this compound may be further reacted into a form that enables the carbon dioxide to be stored permanently. At the same time, electricity can be generated from the downwards stream. For example, electricity can be generated from '$CO_2$-scrubbed air' that passed through and from the tower. This $CO_2$-scrubbed air can contain so much kinetic energy that it may provide sufficient (and potentially excess) energy for the overall capture and storage of such 'atmospheric carbon'.

Whilst a particularly suitable reagent can be ammonia (e.g. that may be produced in a facility located adjacent to the tower), other reagents can include: ammonium (e.g. an ammonium salt in aqueous solution); an oxide/hydroxide pairing e.g. in aqueous solution (such as an oxide/hydroxide pairing based on magnesium and/or calcium and/or lithium, etc.); amines such as the alkylamines and alkanolamines DEA, ETA/MEA, and MDEA; inorganic solvents such as alkaline solvents; etc.

Ammonia is a particularly suitable reagent as it can be readily produced and supplied on site to the tower such as in an aqueous solution (i.e. as an ammonia-in-water solution). The inventor notes that there is an inherent simplicity and reliability in using an ammonia-in-water solution to remove carbon dioxide from atmospheric air. Additionally, when in solution, ammonia can readily react with (and thus capture) the relatively low levels of carbon dioxide present in the immense quantities of air that aim to be processed in the method and system as disclosed herein. The resultant ammonium bicarbonate that is produced from the reaction of ammonia with carbon dioxide can also be readily further treated, as set forth below, into a form whereby the carbon dioxide is effectively stored permanently. The use of ammonia as the reagent is described in more detail hereafter.

As above, another suitable reagent is magnesium hydroxide. Magnesium hydroxide in solution is readily able to react with and thereby 'scrub' the carbon dioxide from the atmospheric air passing through the tower. Magnesium hydroxide has the added benefit that the final compound produced (i.e. magnesium carbonate) is an already stable, captured/sequestered form of $CO_2$, which can be safely disposed of.

A magnesium hydroxide solution can readily be formed by adding abundant magnesium oxide (e.g. from suitably treated minerals such as magnesite, dolomite, brucite, serpentinite, etc.) to water according to the following reaction:

$$MgO + H_2O \rightarrow Mg(OH)_2 \qquad (a)$$

The resultant magnesium hydroxide solution can then be employed in the tower to react with $CO_2$ present in the atmospheric airstream entering the tower upper end, according to one or more of the following reactions:

$$Mg(OH)_2 + CO_2 \rightarrow MgCO_3 + H_2O \qquad (b)$$

$$Mg(OH)_2 + 2CO_2 \rightarrow Mg(HCO_3)_2 \qquad (c)$$

$$Mg(HCO_3)_2 \rightarrow MgCO_3 + CO_2 + H_2O \qquad (d)$$

Likewise, in place of, or in addition to magnesium, calcium and/or another alkaline-earth metal; and/or lithium or another alkali metal (sodium, potassium, etc.), can be used as the oxide/hydroxide pairing in aqueous solution. However, it is observed that magnesium hydroxide is particularly suitable. In WO 2017/106293, the present inventor describes in further detail the reactions and suitable conditions for the use of magnesium hydroxide, etc. to scrub $CO_2$ from a gas stream. The relevant contents of WO 2017/106293 are incorporated herein by way of cross-reference.

In some embodiments, the method for sequestration of carbon dioxide from atmospheric air may comprise enabling the atmospheric air to pass into an upper end of the elongate hollow tower (typically via an open upper end of the tower). The elongate hollow tower may be a purpose-built tower, such as a so-called "energy tower". An advantage of using an energy tower is that it can be configured to generate electricity from the flow of atmospheric air passing down through the hollow tower. For example, in an energy tower, the kinetic energy of the downstream flow of atmospheric air through the hollow tower can be captured or harnessed (e.g. converted into electrical energy).

In some embodiments, the tower can comprise electricity generation apparatus such as one or more gas (e.g. air) turbines. Other embodiments may additionally or alternatively comprise windmills (e.g. vertical and/or horizontal axis windmills). Typically, such gas turbines are located at a tower lower end (e.g. tower base) and can be activated (and thereby run continuously) as the airstream exits the tower lower end. Employing an electricity generation apparatus can enable the method and system to capture atmospheric carbon and generate electricity at the same time. It should be understood that the electricity generation apparatus may be installed elsewhere within or in the vicinity of the tower, where it is able to intercept or otherwise interact with the airstream.

As set forth above, the downstream flow and the electricity generation apparatus may be sufficient such that the amount of electricity generated can be in excess of that required to power the overall method and system. In other words, the method and system may be a net producer/exporter of electrical energy. Thus, the method and system of $CO_2$ sequestration can 'pay for itself'.

As set forth above, in some embodiments the tower can comprise a so-called 'energy tower'. Examples of an energy tower are shown in each of U.S. Pat. Nos. 3,894,393, 6,510,687 and 6,647,717. It is noted that such towers are best located in coastal, hot-desert environments, i.e. to make use of the hot, dry (i.e. low humidity) atmospheric air and abundant supply of seawater.

Typically, the tower is constructed to be tall enough such that its upper end projects up to, at, or more typically beyond the subtropical inversion layer/level, which is typically around one kilometre above sea level (and which also varies daily and seasonally), especially in hot desert environments. For example, the tower may be constructed with a height such that it mostly projects well above this inversion layer, and into air that is extremely dry and of low humidity for most of the year (i.e. in such hot-desert environments). In an embodiment, the tower may be ~1.2 kilometres high (i.e. such a tower would be half as tall again as currently the world's tallest building, the Burj Khalifa in Dubai). In an embodiment, the tower may have a clear internal diameter at its narrowest point (e.g. at an open upper end thereof) of ~0.4 kilometres. When the tower is this height (>~1 kilometre), typically the aqueous solution comprising the reagent will need to be pumped up to the upper end of the energy tower using a number of pumps, each with a high capacity.

In some embodiments of the method, an aqueous solution (e.g. comprising the reagent) may be charged into the tower, so as to mix with atmospheric air located within and adjacent to the tower upper end. The aqueous solution may be charged into the tower upper end in a manner such that the air is cooled by the aqueous solution—i.e. by evaporative cooling. For example, the aqueous solution may be sprayed across the top of the tower (e.g. downwards into and/or transverse to the air located within and adjacent to the tower upper end). When the tower is located in an environment (e.g. a desert) in which the atmospheric air is hot and dry, at least some of the aqueous solution that is charged into the tower will evaporate, thereby cooling and humidifying the hot, dry (e.g. ambient desert) air. This makes the air within the tower upper end denser, leading to a powerful, 'reverse-chimney' effect. The mixture of aqueous solution and air (i.e. humidified air) thereby passes downwards as a stream through the hollow tower. When the aqueous solution comprises a reagent added thereto that can react with the carbon dioxide, the reaction of the reagent with the carbon dioxide can take place as the combined stream passes downwards through the tower, thereby progressively forming more of the compound in the solution. The combined stream is referred to herein as the "downwards stream" and is also referred to herein as the "airstream" or the "downstream".

In some embodiments of the method, the aqueous solution may have the reagent already added thereto prior to its charging into the tower. Alternatively or additionally, the aqueous solution may be mixed with a separate (e.g. aqueous) solution that comprises the reagent, with such mixing of solutions taking place either prior to charging the aqueous solution into the tower or within the tower itself (e.g. as part of the charging step).

In some embodiments of the method, the aqueous solution can comprise seawater or other brine. The other brine may e.g. be brackish water, or it may be a manufactured brine (e.g. using a locally available salt source). It is noted that seawater or brine may favour some of the reactions as disclosed herein. When the aqueous solution comprises seawater, and depending on the location of the tower, such a source can represent an inexhaustible source of the large volumes of water expected to be required for large-scale deployment of the method and system as disclosed herein.

The high downdraft velocities across a tower that is constructed with a large cross-sectional area can represent an immense airflow. When this airflow passes through and/or is directed through suitable electricity generation apparatus, such as one or more (e.g. batteries) of suitably selected and configured gas turbines, substantial quantities of electricity may be generated. As above, any excess electrical energy generated can be available for export (i.e. after allowing for the demands of the method and system itself, which include: pumping (sea)water to the top of the tower and other system pumping requirements; reagent production and mixing; materials separation and handling stages; etc.).

In some embodiments of the method, the solution comprising the compound may be separated from the downwards stream, with a 'cleaner' airstream able to be released back to atmosphere. For example, the method can be operated to produce a cooler, humidified, $CO_2$-scrubbed airstream that is enabled to exit the tower. The $CO_2$-scrubbed airstream may exit via the one or more gas turbines. As set forth above, these may be located at the tower lower end (e.g. base) and are typically configured to generate electricity.

As set forth above, typically the atmospheric air is enabled (e.g. caused) to pass into an open upper end of the hollow tower. For example, the method can be operated continuously whereby, as the atmospheric air passes into the tower via its open upper end and is cooled (e.g. by mixing with the aqueous solution being continuously charged into and adjacent to the tower upper end), the humidified air/solution mixture immediately starts to descend in the tower, whereby more atmospheric air is drawn into the tower open upper end, is cooled, descends, and so on. Electricity generation can, as a result, also be continuous.

In some embodiments of the method, the aqueous solution may be charged (e.g. sprayed, atomised, misted, etc.) as droplets or mist into the air within and adjacent to the tower upper end. This promotes both rapid evaporative cooling, as well as rapid mixing of the air with the aqueous solution, whereby reaction of the $CO_2$ with the reagent commences immediately.

In some embodiments of the method, the solution comprising the compound may be separated from the downwards stream and collected at a lower end of the tower. As set forth below, the solution comprising the compound can be 'regenerated' from the humidified airstream, such as by eliminating the solution (e.g. using mist eliminators) and/or by condensation of the solution (e.g. on relatively cooler surfaces). The solution may then be collected (and optionally stored) for subsequent processing.

When the reagent added to the aqueous solution comprises ammonia, the compound formed in the solution can comprise ammonium bicarbonate. The solution comprising ammonium bicarbonate may be separated from the scrubbed airstream and may be reacted with a metal silicate to form a metal carbonate or bicarbonate and silica. Advantageously, this can also release ammonia back into the solution. Thus, ammonia can be regenerated, and so can be seen to act as a catalyst in the method and system. The reaction of the ammonium bicarbonate solution with the metal silicate can also produce an aqueous slurry.

In other embodiments of the method, the reagent added to the aqueous solution may comprise magnesium hydroxide (e.g. produced from magnesium oxide added to the solution) and the compound formed in the solution can comprise magnesium carbonate. Thus, the solution that is separated from the scrubbed airstream comprises magnesium carbonate and this may readily be separated from the solution and safely disposed of (e.g. repatriated back to a mined site or passed with e.g. seawater to the ocean, etc.).

It should be noted that metal silicate minerals are abundant in the Earth's crust and thus the method can make use of a mineral that is likely to be found in close proximity to the tower. For example, abundant ultramafic (also known as ultrabasic) rocks are those rich in the magnesium-rich silicate minerals olivine $Mg_2SiO_4$, enstatite $MgSiO_3$, and serpentinite $Mg_3Si_2O_5(OH)_4$. Further, the olivine-rich rock—peridotite is the major component of the Earth's mantle, making it the Earth's most abundant rock. Peridotite tends to embrace a range of minerals that have their own range of compositions between olivine and enstatite including dunite, harzburgite, Iherzolite and wehrlite. Other suitable sources of metal silicate minerals include the nickel- and other base metal-rich ultramafic rock komatiite, found in ancient cratons in Australia, Canada and South Africa. Such rocks may be exposed and thus accessible in desert environments. Such minerals may be used in either the ammonium bicarbonate reaction and/or the formation of magnesium hydroxide solution.

When ultramafic rocks are exposed to wind and rain over geological time periods, these rocks are converted (i.e. weathered) to carbonate rocks (e.g. magnesite—$MgCO_3$) plus silica; in this regard, the mineral olivine is more reactive than the mineral serpentinite, hence is generally less common within the upper, more exposed levels of the Earth's crust. Hence, the method and system seek to emulate Nature, by making use of less-weathered forms of the metal silicate minerals (e.g. MgO) to react with the compound (e.g. ammonium bicarbonate) that is formed in the solution recovered from the energy tower and/or to form magnesium hydroxide solution. Such a mineral may be pre-treated (e.g. crushed, ground/milled and e.g. activated) prior to being reacted with the compound (e.g. ammonium bicarbonate) in solution.

In some embodiments of the method, when a metal bicarbonate is formed by reacting the metal silicate with ammonium bicarbonate in the solution (i.e. the solution that is recovered from the airstream), this metal bicarbonate may be further converted into a metal carbonate. The resulting metal carbonate represents a 'sequestered' form of the atmospheric carbon dioxide, with the metal carbonate able to be 'stored' (e.g. returned back to the original site from which the metal silicate mineral was sourced/mined).

When the metal silicate mineral is a magnesium-rich silicate mineral (such as olivine $Mg_2SiO_4$, enstatite $MgSiO_3$, or serpentinite $Mg_3Si_2O_5(OH)_4$), the carbonate that is produced and that can be stored can typically comprise magnesite ($MgCO_3$). Magnesite is a geologically stable mineral that may be viewed as 'stored carbon dioxide'.

In the course of converting e.g. bicarbonate to carbonate, carbon dioxide is produced. This $CO_2$ can be reacted with additional reagent to thereby produce more compound for reacting with the metal silicate. However, as set forth above, such a reagent (e.g. ammonia) can be regenerated for re-use in the energy tower to scrub more atmospheric $CO_2$. However, because of the abundance of magnesium in various mineral types, MgO and magnesium hydroxide typically do not need to be regenerated.

In some embodiments of the method, the carbon dioxide produced during conversion of the bicarbonate to carbonate may be collected and 'recycled'/reacted with the ammonia in aqueous solution (i.e. in the aqueous slurry) to form more ammonium bicarbonate, which additional ammonium bicarbonate is then able to react with additional metal silicate. Again, and as explained in further detail below, it should be noted that the overall result is a net removal and conversion of the atmospheric carbon dioxide to a suitable 'storable' metal carbonate form.

In some embodiments of the method, the metal carbonate that is ultimately produced may form a precipitate and thus may readily be separated from the aqueous solution (i.e. from the aqueous slurry). The precipitate, along with other insoluble solids present in the metal silicate mineral, may be separated from the aqueous solution (i.e. slurry) using e.g. known solids-liquids separation techniques/apparatus.

Typically, prior to the solids-liquids separation, the reagent (e.g. ammonia) may be recovered from the aqueous slurry for recycling to the tower (i.e. for re-use in scrubbing of atmospheric $CO_2$ in the tower).

For example, in one embodiment, prior to passing the slurry to the solids-liquids separation stage, the method may further comprise heating of the aqueous slurry comprising the metal carbonate and other insoluble solids.

The heating may be conducted to distil off e.g. the ammonia present in the slurry/solution. As set forth below, the heating may be performed in a multi-stage distillation apparatus. The distilled off ammonia, along with distilled off water, may be collected and condensed to (re)form an ammonia-in-water solution (e.g. in a more suitably concentrated form). This (optionally concentrated) solution may then be recycled to the tower for further use in scrubbing of atmospheric $CO_2$ in the tower.

In some embodiments, the collected ammonia-in-water solution may be concentrated in an additional ammonia-water separation stage, such as a fractionating facility that partially fractionates the solution (e.g. by distillation processes) to produce a stream of potable water and a second stream that contains essentially all of the ammonia but in a more concentrated aqueous solution. This more concentrated aqueous solution may comprise the solution that is recycled to the tower for further use in scrubbing of atmospheric $CO_2$ in the tower.

When the method and system as disclosed herein are deployed in adjacency of concentrated sources of carbon dioxide (e.g. thermal power stations, raw natural gas processing plants, ammonia plants (fuelled by natural gas), cement plants and the like), it is conceivable that at least a proportion of the flue and other gas emissions may be directed to the elongate tower for processing in accordance with the present method and system, rather than being released directly to atmosphere.

Also disclosed herein is a system for sequestration of carbon dioxide from atmospheric air. As set forth above, the system can comprise an elongate hollow tower that is configured such that the atmospheric air containing carbon dioxide is able to pass downwards through the tower from a tower upper end towards a tower lower end. For example, the tower can be constructed such that its upper end is open. In an embodiment, the tower may be constructed to flare out towards the tower upper end to provide a wide 'throat' that enhances the passage therein of the atmospheric air. As set forth above, the tower may be located and sized so as to produce a downwards stream with significant kinetic energy.

The system can further comprise a distributor that is arranged to charge (e.g. to spray, atomise, mist, etc.) into the tower an aqueous solution comprising a reagent therein that is able to react with the carbon dioxide to form a compound in the solution. The formation of the compound in the solution sequesters the carbon dioxide from the atmospheric air. When charged into the tower, the aqueous solution mixes with the atmospheric air to evaporatively cool the air, thereby causing the mixture to pass as a downwards stream through the tower. As set forth above, as the stream passes downwards through the tower, the carbon dioxide is able to react with the reagent to form the compound in the solution. As set forth above, the aqueous solution may comprise ammonia as the reagent (forming an ammonia-in-water solution) or it may comprise magnesium hydroxide as the reagent in solution. Typically, the aqueous solution comprising the reagent is pumped up to the distributor. The compound (e.g. ammonium bicarbonate or magnesium carbonate, respectively) can progressively be formed in the aqueous solution as its passes downwards through the tower.

The system can further comprise electricity generation apparatus. The electricity generation apparatus can be arranged to generate electricity from the downwards stream that is passing through the hollow tower. As set forth above for the method, the electricity generation apparatus may comprise one or more gas (e.g. air) turbines configured to generate electricity. The one or more gas turbines may be arranged at the tower lower end (e.g. tower base). Each gas turbine may comprise a specially configured air turbine that is arranged to receive therethrough the airstream scrubbed of carbon dioxide, to thereby generate electricity, prior to the scrubbed airstream exiting the tower to atmosphere.

However, other types of electricity generation apparatus may be employed in conjunction with the tower, to harness the kinetic energy of the downwards stream, e.g. such as windmills (e.g. horizontal axis windmills located within the tower, vertical axis windmills arranged at a downstream outlet from the tower, etc.).

In some embodiments, the system may additionally comprise a separator. The separator may be arranged to separate the solution comprising the compound from the downwards (air)stream. Thus, an airstream that is scrubbed of carbon dioxide is enabled to exit the tower. The separator may be arranged at a lower end of the tower to facilitate release of a scrubbed (and humidified) airstream from the tower at its lower end. As set forth above, the separator may comprise a surface and/or mist eliminators that are arranged at e.g. a base located at the tower lower end such that the solution comprising the compound is able condense and/or coalesce at and thus be separated by the separator.

In some embodiments, the electricity generation apparatus may be arranged to generate electricity from the scrubbed airstream produced by the separator. The electricity generation apparatus can be further arranged to release the scrubbed airstream from the tower. For example, the surface may be located prior to the electricity generation apparatus (e.g. prior to the gas turbines). Further, the mist eliminators may be located prior to and/or after the electricity generation apparatus (e.g. after the gas turbines). The surface may comprise a convex or parabolic surface located at the base of the tower, which can thereby direct the descending air downstream to the electricity generation apparatus (e.g. to the gas turbines).

In some embodiments, the distributor may be arranged to distribute (e.g. spray, etc.) the aqueous solution comprising the reagent as droplets or mist into air located adjacent to an open upper end of the tower. The resultant mixture of evaporatively cooled air and moisture that passes downwards as a stream through the hollow tower has the effect of drawing more atmospheric air into the open upper end of the hollow tower to mix with further aqueous solution that continues to be charged into and adjacent to the tower upper end, and so on to produce a continuous downstream.

In some embodiments, the system may further comprise a collector. The collector may take the form of one or more holding vessels (e.g. holding launders). The holding vessels (e.g. launders) can be arranged to receive the solution that is separated by the separator. The holding vessels can allow for a build-up (i.e. a banking) of solution with atmospheric $CO_2$ captured therein. This then enables the solution to be systematically and periodically processed to ultimately produce a sequestered form of $CO_2$.

In some embodiments, the system may further comprise apparatus for producing the aqueous solution that comprises the reagent therein that is able to react with the carbon dioxide to form a compound in the solution.

When, for example, the reagent is ammonia, the apparatus for producing the aqueous solution may comprise a plant for recovering ammonia from the aqueous solution (e.g. from slurries) produced during operation. Optionally, the system may also comprise a plant for the production of additional ammonia as may be required to make up for any losses in the overall method and system. The ammonia may be added to the aqueous solution (e.g. to seawater) to produce an ammonia-in-water solution for use in the system.

When, for example, the reagent is magnesium hydroxide, the apparatus for producing the aqueous solution may make use of the reactors as described hereafter for treating and processing a metal silicate (e.g. these reactors can be used to produce MgO which, when added to solution, produces magnesium hydroxide reagent).

When the reagent is ammonia, the system may further comprise one or more reactors. Each reactor may comprise a series of reactors. The reactors may be arranged to receive the solution comprising ammonium bicarbonate that is separated by the separator (e.g. the reactors may receive the solution from the one or more holding vessels). The reactors may be further arranged such that the ammonium bicarbonate solution is able to be mixed with a metal silicate, such as one or more of the suitably treated (e.g. crushed and ground/milled) metal silicate minerals as set forth above, to form a slurry. Prior to passing into and/or whilst in the reactors, the solution/slurry may become heated to promote the formation of metal bicarbonate, metal carbonate and silica, and further to convert the metal bicarbonate into metal carbonate, while releasing both ammonia and some carbon dioxide back into solution, to form more ammonium bicarbonate. The heat can come from heat exchange prior to the solution passing into the reactor(s) and can also come from the reaction itself (i.e. the reaction being exothermic).

When the reagent is ammonia, the system may further comprise one or more separation units. The separation units can be arranged to separate the metal carbonate (and other insoluble solids present in the metal silicate mineral) from the slurry.

When the reagent is ammonia, the system may further recover ammonia from the slurry for re-use in the tower. In this regard, the one or more separation units may comprise distillation apparatus (e.g. a multi-stage distillation facility such as a multi-stage flash evaporator) that is arranged for heating the slurry that comprises the metal carbonate (along with other insoluble solids). The distillation apparatus can distil off ammonia present in the slurry.

When the reagent is ammonia, the system may comprise a condenser in which the ammonia along with water distilled off in the distillation apparatus are condensed to form an ammonia-in-water solution. The ammonia-in-water solution may be recycled for re-use in the energy tower.

When the reagent is ammonia, the system may further comprise an ammonia-water separation facility, such as fractionating apparatus. An apparatus can be selected that partially fractionates the condensed solution (e.g. by distillation processes). This can produce a stream of potable water as well as a second stream that contains essentially all of the ammonia, but in a more concentrated aqueous solution to be recycled to the tower for further use in scrubbing of atmospheric $CO_2$ in the tower.

Additionally, the one or more reactors and separation units may be further arranged such that the carbon dioxide produced from the conversion of the metal bicarbonate into metal carbonate can be collected and recycled/reacted with the ammonia in solution to form more ammonium bicarbonate. This additional ammonium bicarbonate may be reacted with additional metal silicate to produce more metal carbonate and more ammonia in solution.

When the reagent is magnesium hydroxide, the resultant magnesium carbonate (i.e. that is produced in the solution passing downwards through the tower) can easily be separated and then safely disposed of (e.g. passed to the ocean with seawater, repatriated to a mine site, etc.). Due to the abundance of magnesium reagent feedstock in various mineral types, it is not necessary to reprocess the resultant magnesium carbonate to produce more magnesium hydroxide reagent.

When the solution passing downwards through the tower comprises a proportion of magnesium bicarbonate, the resultant separated solution can be aged (e.g. in thickening reactors) to enable more of the magnesium carbonate to form, prior to disposal. However, if disposing to the sea, magnesium bicarbonate can pass with the slurry to the sea (i.e. magnesium bicarbonate is abundant in the sea). Also, magnesium carbonate, un-reacted magnesium hydroxide and magnesium bicarbonate, being alkaline, all function to offset increased ocean acidity.

BRIEF DESCRIPTION OF THE DRAWINGS

Embodiments of a method and system as set forth in the Summary will now be described, by way of example only, with reference to the accompanying drawings, in which.

DETAILED DESCRIPTION OF SPECIFIC EMBODIMENTS

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

In the method and system as depicted in FIGS. 1 to 5, the reagent referred to and described is ammonia. However, where the reagent is e.g. magnesium hydroxide, a modified 'downstream' setup for the method and system would result, due to there being no need to recycle magnesium carbonate reagent by-product (i.e. this by-product is stable and safe for disposal). Further, a ready re-supply of magnesium for magnesium hydroxide reagent generation is available across most regions of the earth.

BACKGROUND DISCUSSION

Prior to describing the method and system as depicted in FIGS. 1 to 5, some background on the application of the olivine-rich rock peridotite in the reaction with and storage of carbon dioxide will first be provided. Also, it should be understood that other ultramafic rocks may be applied to this end. Such reactions may be utilised as part of the present method and system to securely store (sequester) carbon dioxide.

The overall reaction by which carbon dioxide converts the mineral olivine to 'stored carbon dioxide' can be represented as:

$$Mg_2SiO_4 + 2CO_2 \rightarrow 2MgCO_3 + SiO_2 \qquad 1)$$

This reaction is strongly exothermic, which promises an overall methodology that is able to generate useful amounts of surplus heat energy. However, while the reaction is fast in geological terms it is slow in industrial terms. Its kinetics may be enhanced by the presence of common salts such as found in seawater: sodium chloride and bicarbonate, and by agitating the particles to remove continuously any build-up of impermeable, hence reaction-limiting, silica scale on the growing magnesite crystals. At low temperatures, hydrated forms of magnesite such as the mineral nesquehonite $MgCO_3 \cdot 3H_2O$ tend to form, which represent sub-optimal carbon dioxide storage options compared with magnesite. Optimal reaction conditions as set forth herein are selected to favour the production of magnesite rather than such hydrated compounds, although in some embodiments, e.g. where discharge of a blend of hydrated forms of magnesite including nesquehonite, along with silica, directly into the ocean is acceptable (e.g. to counter effects of ocean acidification), no further processing prior to such discharge (other than to recover ammonia) may be required.

Known methods for speeding up the overall reaction 1) have tended to focus on raising the partial pressure of carbon dioxide by compressing it to pressures in excess of 100 Bar, and heating the reactants dispersed in water to around 185° C., this temperature being an optimum between accelerating the rate of reaction 1), and minimising the tendency of magnesite to decompose to magnesium oxide and carbon dioxide at higher temperatures (see e.g. "A review of mineral carbonation technologies to sequester $CO_2$." A. Sanna, M. Uibu, G. Caramanna, R. Kuusk, and M. M. Maroto-Valer. Chem. Soc. Rev., 2014, 43, 8049).

At these temperatures and pressures, in the presence of water containing common salt and sodium bicarbonate, reaction 1) can essentially complete in around 6 hours. However, achieving these conditions in an energy-tower environment is observed to be impracticable, so instead the reaction period is substantially extended to compensate for a necessary lowering of temperatures to those practicable under near-ambient pressures.

Catalytic Enhancement by Ammonia

It is observed that the reaction between 'captured' carbon dioxide and ultramafic rock may be accelerated if such carbon dioxide is exposed to the rock by first using ammonia to capture the carbon dioxide, thereby converting this to a solution that is rich in, in particular, ammonium bicarbonate, as follows:

$$NH_3 + H_2O + CO_2 \leftrightarrow NH_4^+ + HCO_3^- \qquad 2)$$

Figure 1:
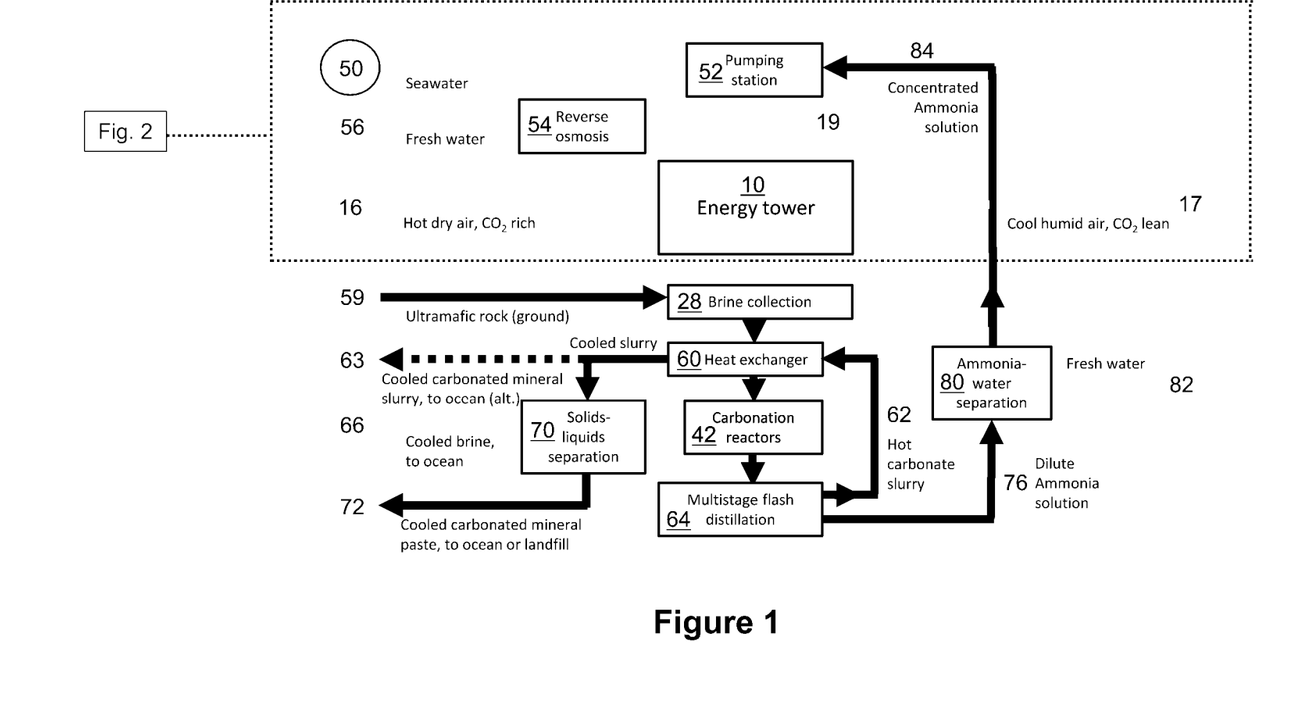
FIG. 1 is a schematic flow diagram of a first embodiment of a carbon dioxide sequestration method and system set forth in the Summary.
Figure 2:
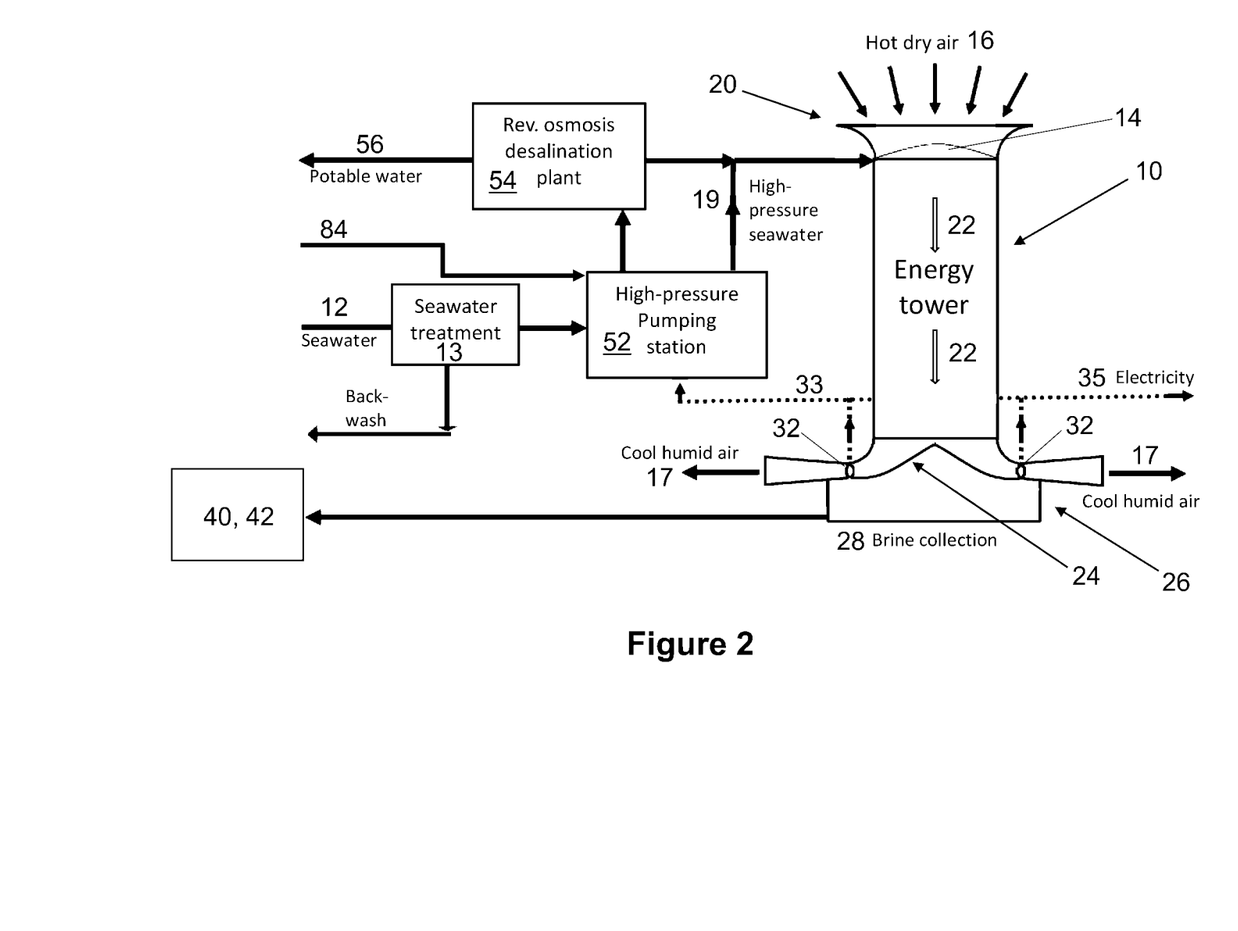
FIG. 2 is a schematic flow diagram of initial stages of the method and system as shown by the box in dotted outline in FIG. 1.
Figure 3:
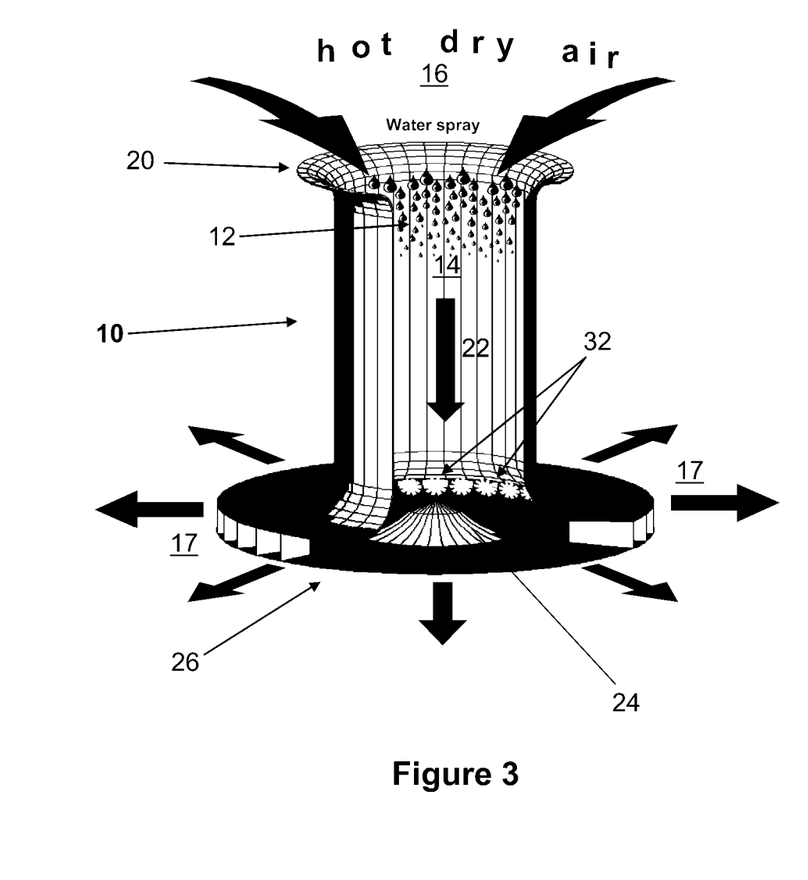
FIG. 3 is a schematic depiction of an energy tower for use in a method and system as set forth herein.
Figure 4:
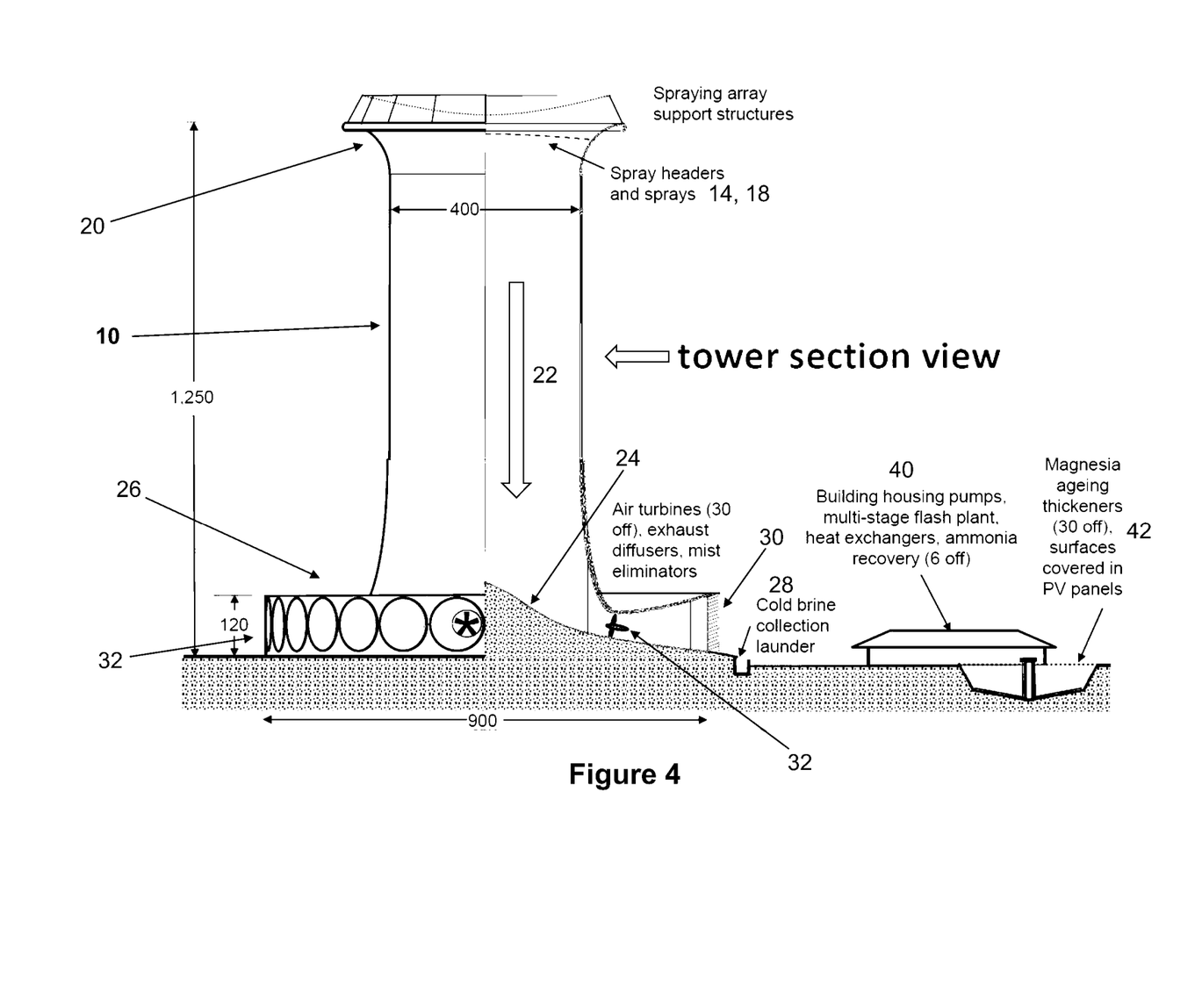
FIG. 4 is a further schematic partly cross-sectioned depiction of an energy tower that has been modified for use in a method and system as set forth herein.

As illustrated in FIGS. 1 to 5, a scrubbing medium: seawater/brine 12 is treated (e.g. screened/filtered) at station 13 and is then passed into a seawater holding basin 50 (FIG. 1). The seawater is drawn from basin 50, via a high-pressure pumping station 52, to be pumped up 19 to a flared upper end 20 of an energy tower 10 (FIGS. 2-4). The seawater is sprayed 14 via a distributor in the form of a spraying system 18 (FIGS. 4 & 5) into the air located in the vicinity of the tower upper end as droplets, mist, etc.

Initially, at commencement, the seawater/brine 12 is dosed with a relatively small percentage of ammonia to serve as the active reagent for extracting carbon dioxide from the air. However, as explained below with reference to the overall continuous, 'closed-loop' process of FIG. 1, a recycled ammonia-in-water solution 84 is thereafter mixed with the seawater in pumping station 52, with the combined solution then being sprayed via spraying system 18.

Typically, the air that passes into the open upper end 20 of the energy tower 10 is a hot, dry, $CO_2$-rich air 16 (FIG. 2)—i.e. as found in the afore- and later-mentioned desert regions of the world). The air leaving the tower is a cool $CO_2$-lean air stream 17. When the ammonia-containing spray droplets that are sprayed within the tower contact carbon dioxide within the air 16 passing into the tower, they form ammonium bicarbonate (as per reaction 2) above).

To capture ~90% of the roughly 45 million tonnes of carbon dioxide present in the nominally 108 billion tonnes of air that may be caused to pass through the energy tower each year, reaction 2) requires annually a stoichiometric 15 million tonnes of ammonia be added to the seawater scrubbing medium, making a solution of 1.5% ammonia by weight. Assuming ~90% of the carbon dioxide passing through the tower reacts with the ammonia, around 70 million tonnes of ammonium bicarbonate will form, yielding a solution concentration of 6.0%, according to reaction 2)—above.

Where the ammonia addition rates are limited/controlled to the stoichiometric quantity, this ensures that the brine (i.e. seawater) solution will remain slightly acidic throughout the tower, hence preventing any slip of ammonia into the air exhausting the tower lower end (e.g. base) of the energy tower.

In the embodiments depicted, some of the aqueous solution comprising ammonia that is charged (i.e. via the spray system 18) into the air located within and adjacent to the energy tower flared, open upper end 20 evaporates. This evaporation serves to cool and humidify the air (which is typically hot, dry ambient desert air when the energy tower is so-located). This makes the air denser, leading to a powerful, reverse-chimney effect with potentially high downdraft velocities. When combined with a relatively large tower diameter, this can yield an immense airflow in the energy tower 10.

Thus, as illustrated by each of FIGS. 2, 3 & 4, the atmospheric air containing carbon dioxide flows as a stream 22 down through the energy tower 10 along with the aqueous solution comprising ammonia. The high air flow and resulting turbulence cause the air and aqueous solution to vigorously mix, whereby the carbon dioxide reacts with the ammonia to form the ammonium bicarbonate solution.

As best illustrated by FIG. 4, the high humidified airflow 22 engages with a convex surface 24 located at the base 26 of the energy tower 10. At least some of the solution present in the ammonium bicarbonate solution will condense/coalesce at the convex (e.g. conical) surface 24 and will thereby flow down to be collected in the under-positioned (FIG. 2) or laterally-positioned (FIG. 4) collection launder 28 located at or surrounding the base 26 of the energy tower 10.

The solution that does not condense/coalesce at surface 24 is eliminated by mist eliminators 30, which are typically located after a bank or series of specially selected gas turbines in the form of air turbines 32 (i.e. so as to preserve as much of the airflow velocity passing to the turbines). The mist eliminators 30 capture remaining airborne ammonium bicarbonate solution from the turbine exhaust and direct it into the collection launder 28.

Typically, the bank of air turbines 32 surround the base 26 of the energy tower 10 (i.e. to generate a maximum amount of electricity). A proportion of this electricity can be fed 33 to the pumping station 52, with the remainder being fed 35 to the main electricity grid.

The collected carbonated brine held in collection launder 28 is now ready to be mixed and reacted with a metal silicate mineral, such as may be extracted from abundant ultramafic rocks located in the vicinity of the energy tower. This reaction enables the ammonium bicarbonate in solution to be converted into a more stable and 'storable' form. Whilst the mixing of the carbonated brine with the metal silicate mineral can occur in collection launder 28, the reaction is promoted by heat exchange (refer to description of overall process shown in FIG. 1—below).

Figure 5:
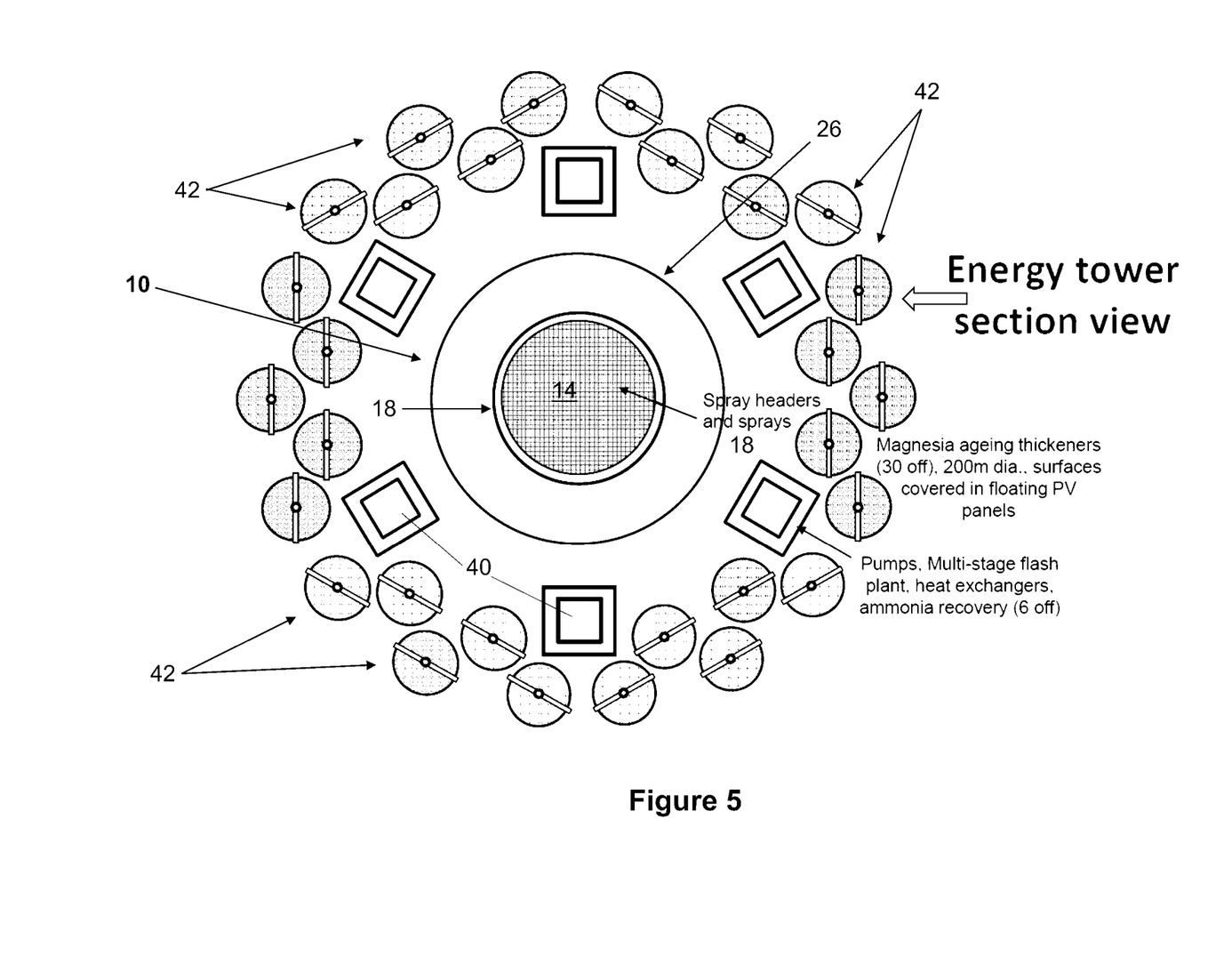
FIG. 5 is a plan elevation of the modified energy tower as set forth in FIG. 4.

In FIGS. 4 & 5, these reactions are shown as taking place in the multi-stage flash plant and heat exchange facilities 40, and in the magnesia ageing and thickening reactors 42. As shown in FIG. 5, six such facilities 40 are evenly spaced around the base 26 of the energy tower 10, with five ageing and thickening reactors 42 being arranged and associated with each of the six facilities 40 (i.e. thirty reactors 42 in total).

Typically, the energy tower 10 is constructed in a hot, dry location noting that metal silicate rocks tend also to be easily accessed in such locations. The locations include the countries surrounding the Arabian sea, northwest Australia, western Sahara, the Kalahari Desert in southern Africa, Baja and Sonora in Mexico, and the Atacama Desert in Chile and Peru).

In the following description, reference to the ultramafic rock peridotite as an example metal silicate will mainly be given, noting that other ultramafic rocks can be employed.

Carbonation of Ultramafic Rocks

In the next stage of the method and system, the crushed and ground peridotite (in which the main mineral is olivine) is added to the carbonated brine collected in the launder 28 (although this addition and mixing may occur in separate mixing tanks/ponds located adjacent to the launder 28). The brine/peridotite mixture (e.g. aqueous slurry) is passed into each of the facilities 40, where the reaction conditions are then optimised. It should be noted that, as part of the reaction, the mineral olivine ($Mg_2SiO_4$) will show a small tendency to hydrolyse as follows:

$$Mg_2SiO_4 + 2H_2O \leftarrow\!\!\rightarrow 2Mg^{++} + SiO_2 + 4OH^- \qquad 3)$$

The ammonium ions tend to combine strongly with the hydroxyl ions produced by such hydrolysing to thereby form ammonia and water. It is noted that ammonia and water show little tendency to ionize to form ammonium and hydroxyl ions. This is consistent with the fact that ammonium hydroxide $NH_4OH$, in reality largely a solution of ammonia in water, is a very weak base, which is to say, the equilibrium for the following reaction 4) is far to the right:

$$NH_4^+ + OH^- \leftarrow\!\!\rightarrow NH_3 + H_2O \qquad 4)$$

The effect of the equilibrium of reaction 4) being far to the right is to reduce the concentration of hydroxyl ions in solution. This in turn tends to shift the equilibrium of reaction 3) further to the right, prompting more of the olivine to yield its magnesium values into solution (thereby leaving behind insoluble silica). The magnesium ions will tend to associate with the bicarbonate ions from reaction 2) to form magnesium bicarbonate, as follows:

$$Mg^{++} + 2HCO_3^- \leftarrow\!\!\rightarrow Mg(HCO_3)_2 \qquad 5)$$

Then, by means to be discussed below, the magnesium bicarbonate is removed from solution by conversion to the essentially insoluble normal carbonate, as follows:

$$Mg(HCO_3)_2 \leftarrow\!\!\rightarrow MgCO_3 + H_2O + CO_2 \qquad 6)$$

The carbon dioxide formed by reaction 6) is effectively 'recycled', i.e. the $CO_2$ reacts with the ammonia to form more ammonium bicarbonate, hence the $CO_2$ produced by reaction 6) will feed through the series of reactions above.

Setting out these reactions with consistent quantities, and adding them (resulting in the deletion of the reactants and products in italics) reveals the following reaction series:

$$4NH_3 + 4H_2O + 4CO_2 \leftarrow\!\!\rightarrow 4NH_4^+ + 4HCO_3^- \qquad 2)$$

$$Mg_2SiO_4 + 2H_2O \leftarrow\!\!\rightarrow 2Mg^{++} + SiO_2 + 4OH^- \qquad 3)$$

$$4NH_4^+ + 4OH^- \leftarrow\!\!\rightarrow 4NH_3 + 4H_2O \qquad 4)$$

$$2Mg^{++} + 4HCO_3^- \leftarrow\!\!\rightarrow 2Mg(HCO_3)_2 \qquad 5)$$

ending with just the reactants, as follows:

$$4CO_2 + Mg_2SiO_4 + 2H_2O \leftarrow\!\!\rightarrow 2Mg(HCO_3)_2 + SiO_2 \qquad 7)$$

and finally:

$$2Mg(HCO_3)_2 \leftrightarrow 2MgCO_3 + 2H_2O + 2CO_2 \qquad 6)$$

As set forth above, the $CO_2$ released in reaction 6) reacts with the ammonia as per reaction 2), thereby producing more ammonium bicarbonate, with the bicarbonate ions then associating with the magnesium ions to form more magnesium bicarbonate as per reaction 5).

Ammonia's role in the method and system as disclosed herein can thus be seen as 'catalytic', thus it will persist in the system, with the ammonia being recovered for re-use in the energy tower to scrub more $CO_2$ from the atmospheric air.

It should be noted that reaction 6) represents a simplification. The insoluble compounds first formed from the decomposition of magnesium bicarbonate may be hydrated compounds including the mineral nesquehonite $MgCO_3 \cdot 3H_2O$. To convert these compounds to anhydrous magnesite (which will generally be preferred because disposal of nesquehonite and other hydrated forms of magnesium carbonate directly into the ocean is unlikely to be favoured in most settings) the slurry hosting them can be dosed with small magnesite crystals to serve as seeds for their enlargement through Ostwald ripening, while maintaining the slurry at high (i.e. near-boiling) temperatures for as long as several days to weeks.

Once all reactions are complete, reaction 1) remains:

$$Mg_2SiO_4 + 2CO_2 \rightarrow 2MgCO_3 + SiO_2 \qquad 1)$$

Assuming all reactions as depicted above proceed fully, each tonne of carbon dioxide captured and permanently stored will require stoichiometrically around 1.6 tonnes of pure olivine. But since the olivine will not be pure, and the extraction of magnesium values from the rock may be less than complete, typically around two tonnes of an olivine-rich peridotite (e.g. dunite) is used to capture and store one tonne of carbon dioxide.

Overall Process (FIG. 1)

A description of an embodiment comprising both the energy tower complex (FIGS. 2 & 3) and the additional plant and equipment required for the capture and storage of carbon dioxide scrubbed from the atmosphere (FIGS. 4 & 5) will now be provided. General reference will be made to the method and system as depicted schematically in the FIG. 1 flowsheet, where like reference numbers denote like parts to those numbers used in FIGS. 2-5, although reference is also made to FIGS. 2-5. FIG. 1 sets out a generic flowsheet for an energy tower-based method and system for storing (as magnesite) carbon dioxide that the energy tower scrubs from the atmosphere.

Initially, suitable sites are selected for the energy tower 10. As set forth above, ideally these are in the world's coastal desert regions which tend to lie between latitudes 20-30 degrees from the equator—e.g. northwest Australia (the Pilbara); Atacama Desert in Northern Chile/Southern Peru, Kalahari Desert in Namibia, Western Sahara, the Sultanate of Oman and other regions around the Arabian Sea stretching to coastal Iran, Pakistan and far-western India (western Gujarat). It is noted that a number of such sites would be out of the world's major flight paths (i.e. for flying altitudes of ~1 km) hence the construction of one or more massive energy towers in such regions should not represent an aviation hazard. The subtropical inversion level (Hadley inversion) in such areas is typically around one kilometre above sea level but varies daily and seasonally; ideally the energy tower that is constructed at such sites should be tall enough to project well above this inversion layer, into air that is extremely dry for most of the year.

Seawater is accessed and screened at station 13 (see FIG. 2). The screened seawater is pumped to a fresh seawater holding basin 50, ready for use. The basin 50 can comprise a dam that is approximately 25 hectares in area and 10 metres deep. From this basin, water is withdrawn at a rate of around 1.3 billion tonnes per annum. Consistent with reaction 2), to capture 40 million tonnes of carbon dioxide, some 15 million tonnes of ammonia are added to the seawater (roughly 2,000 tonnes per hour), in suitable mixing vessels located in the pumping station 52. When the ammonia-in-seawater solution is pumped from the pumping station 52 to the upper end 20 of the energy tower 10, it forms a solution of approximately 1.3% by weight ammonia in the seawater. The initial 'seed' ammonia, as well as top-up ammonia, can be produced in an ammonia plant constructed and located at the site of the energy tower 10.

As the ammonia-in-seawater solution is sprayed into and passes down 22 through the energy tower, its concentration increases (due to evaporation of water) to around 3% at tower base level 26, by which time it will have been converted to 70 million tonnes of ammonium bicarbonate/annum, forming a solution of around 620 million tonnes/annum containing just over 11.5% ammonium bicarbonate by weight along with 8.1% sea salts (mostly sodium chloride).

Assuming annual conditions for the air entering the tower open upper end 20 are 30° C. and 10% relative humidity, in passing through the energy tower 10, and becoming close to saturated (90% relative humidity), the air (and water) are cooled to 15° C., while the quantity of moisture per kilogram of air has tripled, from 0.003 kg/kg dry air, to 0.009 kg/kg dry air, an increase of 0.006 kg/kg dry air. It follows that the 108 billion tonnes of air (3,750 tonnes per second) flowing down the tower would gain approximately 650 million tonnes of water vapour per year, a quantity correspondingly lost by the aqueous phase of the solution.

The pumping task involves the pumping station 52 raising the blended seawater (i.e. plus ammonia) from ground level to the upper end 20 of the energy tower 10 and feeding the solution through a distributor in the form of spraying system 18. Typically, this task is divided between and performed by a total of thirty pumps located in the pumping station 52, each capable of pumping up to 2.0 cubic metres per second against ~1,300 metres' total head through pipelines nominally 1.0 metres in diameter (3 m/second flow rate). At peak output times, all thirty pumps would be operating to pump the aqueous solution to the upper end 20 of the tower 10, whereas at other times some pumps can send treated seawater to the reverse osmosis desalination facility 54. In the desalination facility 54, half of the water would pass through membranes as desalinated water 56, with the balance 58, complete with nearly all of the dissolved salt in the raw seawater, being pumped to flow to the spraying system 18 located at the upper end 20 of the tower 10.

As set forth above, at the base 26 of the tower 10, prior to final discharge of the $CO_2$-scrubbed air to the atmosphere, the evaporatively cooled air would be cleaned of any residual brine spray droplets by mist eliminators 30, before being passed to the collection launder 28.

The carbonated brine collected in the collection launder 28 located at or around the base 26 of tower 10, comprised of 520 million tonnes of water, 45 million tonnes of sea-salt and 70 million tonnes of ammonium bicarbonate (all annual figures), and at a temperature typically between 20° C. and 25° C., is dosed 59 with 80 million tonnes per annum of crushed and ground ultramafic rock, typically peridotite, the quantity required to capture 40 million tonnes of carbon dioxide as per reaction 1). As set forth above, the further reaction of the carbonated brine/peridotite is carried out in each of the facilities 40 that are evenly located around the tower 10, where the crushed and ground peridotite (olivine) continues to react with the bicarbonate in the brine.

As set forth above, the crushed and ground peridotite can be mixed with the carbonated brine in each of six blending tanks located in each facility 40 to form a slurry. In other words, the carbonated brine can be pumped from the collection launder 28 to each of six blending tanks located in each facility 40, rather than the peridotite 59 being added to the launder 28 as depicted in FIG. 1.

Prior to entering the reactor/thickener arrays 42 located in each facility 40, the collected brine/peridotite slurry (i.e. each of the six flows) from the energy tower 10 is heated by the exothermic nature of reaction 1). In addition, heat can be transferred to the slurry to raise its temperature to near boiling by passing it through respective heat exchangers 60 associated with each facility 40.

In the embodiment of FIG. 1, each heat exchanger 60 receives therethrough a hot carbonate, ammonia-depleted slurry 62 that is recycled from the multistage flash evaporators of ammonia recovery stage 64. After the recycled slurry 62 heats the brine/peridotite slurry in heat exchanger 60, the cooled brine can either be passed to a solids-liquids separation stage 70 and/or it can be passed 63 directly to the ocean (i.e. where ocean disposal is acceptable/approved).

The resultant heated brine/peridotite slurry (e.g. from each of the six blending tanks and respective heat exchangers 60) is discharged into (in each case) the first of a series of five large circular basins that form the magnesia ageing and thickening (i.e. carbonation) reactors 42. Whilst each reactor is configured as a reactor/thickener (e.g. an open-top tank reactor), each is also provided with a central column/caisson. Each thickener basin reactor 42 is 200 metres in diameter, and has a centre depth of 40 metres. This provides for an effective slurry capacity of one million cubic metres, sufficient to hold around 5 days' output of brine/peridotite slurry. The inside of the basin reactors 42 is lined and sealed with sprayed seawater-resistant concrete. Bridges are provided that span each of the basin reactors to provide access to the centre caisson. The centre caisson supports a rake mechanism which is operated to continuously draw settled solids inwards to the base of the centre caisson.

While it is held in the reactor/thickener arrays, the peridotite slurry is agitated by circulating it through the central caissons of the basin reactors 42, by circulating pumps and high-shear mixers that are capable of recirculating the contents that have been raked into the centre, and capable of discharging them at 10 metres below the surface. As well as circulating the contents within each basin reactor 42, the pumps transfer slurry to the next thickener basin reactor 42 in the series, so that the slurry passes in this way through all five thickener/reactors 42 of the set, taking up to a month to transit all five reactors.

To minimize evaporation and tendencies for the contents of adjacent reactor/thickeners 42 to mix (i.e. particularly in windy weather), the reactor surfaces (total area of the thirty tanks, one square kilometre) can be covered by shade balls. In another variation, the surface can be covered by floating photovoltaic (PV) panels (see e.g. http://latinamericanscience.org/shadeballs-or-floating-solar as an example). While PV panels are more expensive than shade balls, they promise to last longer, and can also generate up to 200 MW of additional useful electricity in clear sunny weather—up to 400 GWh per year (or more if the outer surface of the energy tower were to be coated or formed of a white or otherwise light colour). Since the solar panels will be subject to fallout of brine droplets not collected upstream from the cool air exhaust from the energy tower's air turbine diffusers 30, the panels can be washed periodically (e.g. daily) using desalinated water produced in reverse osmosis facility 54. An advantage of washing the panels with desalinated water is that a layer of water of lower density than the brine/peridotite slurry can form and overlay on the latter, serving as a thermal insulating layer and thereby trapping heat in the slurry, while also keeping the PV panels cool.

By holding the brine plus peridotite plus ammonium bicarbonate slurry at close to the boiling point of water for ~one month's detention time, the reactor/thickeners 42 can allow these reactions to proceed to completion, with the outcome being as per the right-hand side of reaction 1). Seed crystals of magnesium carbonate can be added to encourage crystal growth of the latter compound, at the expense of nesquehonite and similar hydrated magnesite crystals, i.e. by the process of Ostwald ripening:

$$Mg_2SiO_4 + 2CO_2 \rightarrow 2MgCO_3 + SiO_2 \qquad 1)$$

In general, no attempt is made to separate the components of the brine/peridotite slurry until the slurry has been heated and 'aged' (i.e. until essentially a slurry of magnesium carbonate plus silica, suspended in an aqueous brine solution containing dissolved ammonia, has been produced).

Thus, only after completing passage through all five thickener/reactors 42 of the set (of which there are six operating in parallel in the facilities 40), is the hot slurry withdrawn from the reactors. As set forth above, such a procedure may take up to a month.

In the embodiment of FIG. 1, the hot slurry withdrawn from the carbonation reactors 42 is passed to a multi-stage flash distillation (i.e. ammonia separation) facility 64. In facility 64, the ammonia is distilled off from the slurry, typically being distilled off in each of a number of flash evaporators arranged in series. In this regard, the hot slurry is boiled successively (i.e. by stages) under increasingly reduced pressures, whereupon the ammonia contained in the slurry is stripped out by the water vapour that is also produced.

The hot (ammonia-depleted) slurry that is produced in the distillation facility 64 is then passed through the heat exchanger 60 to exchange its heat with the brine/peridotite slurry incoming to reactors 42. As set forth above, the now-cooled, ammonia-depleted slurry can be passed to the ocean, or it can be diverted to the solids-liquids separation facility 70.

In the solids-liquids separation facility 70, the now thick, carbonated mineral slurry of magnesium carbonate ($MgCO_3$), along with silica ($SiO_2$) and other insoluble solids, is separated as stream 72 from a cooled aqueous brine solution 66. The solids are in essence inert, making them suitable for disposable in a variety of different ways. The clarified brine solution 66 that is produced is suitable for passing directly back to the ocean from whence it originated.

The solids-liquids separation facility 70 employs conventional solids-liquids separation stages, including a pair of 120-metre diameter thickeners in each facility 40 that yield a dense slurry of magnesite-rich solids. This slurry (typically in paste form) is pumped away to the designated emplacement site, representing a volume after evaporation of surplus water of some 80 million cubic metres per annum. The design of such emplacement would take into consideration local disposal options.

For example, the substantially cooled, spent paste 72 can be discharged for disposal as landfill, such as at the mine site from which the metal silicate (peridotite) mineral was mined. Some of the paste 72 can also be emplaced in playas on land where these are within ~200 kilometres of the facility. In this regard, the essentially inert slurry can be thickened in the thickeners 70 to varying degrees (e.g. to turn the solids into a pumpable slurry or paste which is then pumped to e.g. the mine site, playa, etc.).

However, should there be a proliferation of such energy tower-based systems, the cooled, spent (i.e. ammonia-depleted) slurry/paste 72 may instead be disposed of in the deep ocean (i.e. option 63 in FIG. 1), to join the much-larger quantities of inert sediments entering the oceans from the natural weathering of rocks and soils on land world-wide. When the total slurry is discharged to the ocean, there may be no need for thickening of the slurry in the thickeners. Further, when the total slurry is discharged to the ocean, the magnesium carbonate has the added benefit of neutralising ocean acidification according to:

$H^+ + MgCO_3 \rightarrow Mg^{++} + HCO_3^-$

Also, in the distillation facility 64, the mixed ammonia-water vapour can be condensed on cooling pipes. These cooling pipes can have flowing therethrough the cool, raw carbonated brine that is collected from the base of the energy tower (i.e. that is to be held in the collection launder 28). This cool, raw carbonated brine is at or below ambient temperatures, and thus the ammonia and water vapour that condenses on the cooling pipes can thereby heat this raw carbonated brine, ready for its reaction with the metal silicate (peridotite). Such heating can thereby represent a heat input into the raw carbonated brine to enhance its reaction with the peridotite. The water-ammonia solution 76 from the condensation of the respective vapours is typically somewhat dilute but can be returned to the energy tower 10 in this form for dosing into the seawater at the pumping station 52.

However, FIG. 1 also shows an option of a fractionating facility 80 in which the relatively dilute water-ammonia solution 76 is fractionated to yield additional fresh water 82 and a more concentrated ammonia-water solution 84.

In this way, up to 99% of the ammonia can be recovered for re-use in the energy tower 10. However, this still means that around 150,000 tonnes per year of ammonia is required as make-up, a quantity equivalent to that of a single scale-efficient ammonia plant, requiring in turn around 75,000 tonnes per year of natural gas. Such ammonia can readily be made according to the familiar Haber-Bosch Process.

When the method and system as disclosed herein employ a reagent other than ammonia (e.g. ammonium ions, such as an ammonium salt in aqueous solution; an oxide/hydroxide pairing, such as an aqueous solution comprising the same (e.g. an oxide/hydroxide pairing based on magnesium and/or calcium and/or lithium, etc.); amines such as the alkylamines and alkanolamines DEA, ETA/MEA, and MDEA; inorganic solvents such as alkaline solvents; etc.) then, to convert the $CO_2$-reagent reaction product into a form that is suitable for storage, a cheap and abundant material (e.g. mineral) is selected that can react with the $CO_2$-reagent reaction product. For at least the ammonium ion, oxide/hydroxide pairing, and alkaline solvents, the ultramafic rocks referred to herein may be suitable.

Where reagents other than ammonia are employed, the slurry that is withdrawn from the carbonation reactors 42 may instead be passed to a solids-liquids or other type of separation facility for separation and recovery of the reagent.

As set forth above, another suitable reagent is magnesium hydroxide, with an aqueous solution of magnesium hydroxide being made according to the inventor's process as outlined in WO 2017/106923 (the relevant contents of which are incorporated herein by reference).

In an embodiment, magnesia (MgO) is added (typically under agitation) to the seawater 12, usually prior to (although it can be added in) the high-pressure pumping station 52, such as in a suitable mixing tank. The MgO may readily be produced using the $Mg_2SiO_4$ as outlined above. In this regard, the $Mg_2SiO_4$ may be acid leached and/or thermally decomposed to produce MgO.

Sufficient time is allowed for a good proportion of the magnesium oxide to convert to magnesium hydroxide (i.e. according to reaction (a) above). The resultant seawater/Mg(OH)$_2$ solution is then pumped under high pressure to the open upper end 20 of the energy tower 10 and is then sprayed into the incoming hot dry airstream 16 via the spray headers 18.

The heat and turbulence of the resultant mix of hot dry airstream 16 and spray droplets of the seawater/Mg(OH)$_2$ solution, along with the height of the energy tower, is sufficient for the seawater/Mg(OH)$_2$ solution to react with and convert a proportion of the $CO_2$ present in the airstream 16 (i.e. according to reactions (b) to (d) above) into magnesium carbonate and bicarbonate (i.e. $MgCO_3$ and $Mg(HCO_3)_2$).

To increase the proportion of the carbonate ($MgCO_3$) produced, the resultant solution that is separated at convex surface 24 and eliminators 30 can be aged in the thickening reactors 42. Additionally, a proportion of the ageing solution can be recycled to the spray system 14 for respraying into the incoming hot dry airstream 16 via the spray headers 18.

Once a sufficient extent of conversion of magnesium hydroxide to magnesium carbonate has been achieved, the resultant total seawater/magnesium carbonate slurry can be returned to the ocean without attempting to separate the solids from the liquid. Here, it is noted that vast quantities of magnesium carbonate are already added to the oceans via the natural weathering of exposed ultramafic rocks. Further, the alkalinity of magnesium carbonate (and including any un-reacted magnesium hydroxide and magnesium bicarbonate) would work to offset increased ocean acidity.

It should be understood that electricity generation apparatus other than (or in conjunction with) gas turbines may be employed in the tower to harness the kinetic energy of the downwards stream. For example, windmills (e.g. horizontal axis windmills located within the tower, vertical axis windmills arranged at a downstream outlet from the tower, etc.).

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A method for sequestration of carbon dioxide from atmospheric air comprising:
   enabling atmospheric air to pass into an upper end of an elongate hollow tower, wherein the elongate hollow tower has a lower end and a height measured from the upper end to the lower end;
   charging an aqueous solution so as to mix with atmospheric air within and adjacent to the elongate hollow tower upper end in a manner such that the air is cooled by evaporative cooling, whereby the mixture passes downwards as a stream through the elongate hollow tower, the aqueous solution comprising ammonia that reacts with the carbon dioxide to form ammonium bicarbonate in the solution to thereby capture the carbon dioxide from the atmospheric air;

generating electricity from the downwards stream that is passing through the elongate hollow tower, wherein the electricity is generated from the downwards stream by passing it through one or more gas turbines that are configured to generate electricity;

separating the ammonium bicarbonate-containing aqueous solution from the downwards stream and reacting said solution with a metal silicate to form a metal carbonate and silica, and to release ammonia back into the solution for recovery and reuse in the elongate hollow tower.

2. A method as claimed in claim 1, wherein the solution comprising the compound is separated from the downwards stream such as at the elongate hollow tower lower end, whereby an airstream scrubbed of carbon dioxide is enabled to exit the elongate hollow tower.

3. A method as claimed in claim 2, wherein the electricity is generated from the airstream scrubbed of carbon dioxide prior to or as it exits the elongate hollow tower.

4. A method as claimed in claim 1, wherein the upper end of the elongate hollow tower is an open upper end, and wherein the aqueous solution is charged as droplets or mist into the air within and adjacent to the elongate hollow tower open upper end whereby, as the mixture passes downwards as a stream through the elongate hollow tower, more atmospheric air is caused to pass into the elongate hollow tower open upper end to mix with aqueous solution being charged into and adjacent to the elongate hollow tower upper end.

5. A method as claimed in claim 1, wherein the carbon dioxide produced as a result of reacting the ammonium bicarbonate with the metal silicate is collected and reacted with the aqueous solution that comprises ammonia to form more ammonium bicarbonate, able to react with additional metal silicate.

6. A method as claimed in claim 1, wherein the metal carbonate and other insoluble solids are separated from the aqueous solution, with the aqueous solution being recycled to recover ammonia for re-use in the elongate hollow tower.

7. A method as claimed in claim 6, wherein prior to said separation, the method further comprises heating of an aqueous slurry that comprises the metal carbonate and other insoluble solids, the heating being conducted to distil off the ammonia present in the solution, with the distilled off ammonia along with distilled off water being collected and condensed to form an ammonia-in-water solution, which solution is recycled to the elongate hollow tower.

8. A method as claimed in claim 1, wherein the aqueous solution has the ammonia added thereto prior to its charging into the elongate hollow tower and/or wherein the aqueous solution is mixed with a separate aqueous solution that comprises the ammonia.

9. A method as claimed in claim 1, wherein the aqueous solution comprises seawater or other brine.

10. A system for sequestration of carbon dioxide from atmospheric air, the system comprising:

an elongate hollow tower having an upper end, a lower end, and a height measured from the upper end to the lower end, the elongate hollow tower configured such that the atmospheric air containing carbon dioxide is able to pass downwards through the elongate hollow tower from the upper end towards the lower end;

an apparatus arranged to produce an aqueous solution comprising ammonia;

a distributor arranged to charge into the elongate hollow tower the aqueous solution comprising ammonia that is able to react with the carbon dioxide to form ammonium bicarbonate in the solution to thereby sequester the carbon dioxide from the atmospheric air and such that the aqueous solution mixes with the atmospheric air to evaporatively cool the air, thereby causing the mixture to pass as a downwards stream through the elongate hollow tower;

one or more reactors arranged to receive the solution comprising ammonium bicarbonate, the one or more reactors being arranged such that the ammonium bicarbonate solution is able to be mixed with a metal silicate to form a slurry and, with heating, to form a metal bicarbonate and silica, and so as to further convert the metal bicarbonate into metal carbonate, while releasing ammonia back into solution;

electricity generation apparatus comprising one or more gas turbines and arranged to generate electricity from the downwards stream that is passing through the elongate hollow tower.

11. A system as claimed in claim 10, wherein a separator is arranged to separate the solution comprising the ammonium bicarbonate from the downwards stream, whereby an airstream scrubbed of carbon dioxide is produced.

12. A system as claimed in claim 11, wherein the separator is arranged at the lower end of the elongate hollow tower to facilitate release of the scrubbed airstream from the elongate hollow tower lower end, the separator comprising a surface and/or mist eliminators arranged at the elongate hollow tower lower end such that the solution comprising the ammonium bicarbonate is able condense and/or coalesce at the separator.

13. A system as claimed in claim 11, wherein the one or more gas turbines are arranged at the elongate hollow tower lower end, the one or more gas turbines being configured to generate electricity from the scrubbed airstream produced by the separator and to release the scrubbed airstream from the elongate hollow tower.

14. A system as claimed in claim 10, wherein the upper end of the elongate hollow tower is open, and wherein the distributor is arranged to distribute the aqueous solution comprising the ammonia as droplets or mist into air located adjacent to the elongate hollow tower open upper end, whereby the mixture passes downwards as a stream through the elongate hollow tower, and whereby more atmospheric air is caused to pass into the open upper end of the elongate hollow tower to mix with aqueous solution being charged into and adjacent to the elongate hollow tower upper end.

15. A system as claimed in claim 10, wherein the apparatus for producing the aqueous solution comprising ammonia comprises a plant for recovering ammonia from the aqueous solution and, optionally, a plant for the production of additional ammonia as required to make up for losses of ammonia, the ammonia being added to the aqueous solution to produce an ammonia-in-water solution for passing to the distributor such that the compound formed in the solution comprises ammonium bicarbonate.

16. A method as claimed in claim 1, wherein the metal silicate comprises an ultramafic rock, such as peridotite.

17. A system as claimed in claim 11, wherein the one or more reactors are arranged to receive the solution comprising ammonium bicarbonate that is separated by the separator, and wherein carbon dioxide produced from the conversion of the metal bicarbonate into metal carbonate is able to be reacted with the solution comprising ammonia to form more ammonium bicarbonate, which is able to react with additional metal silicate to produce more metal carbonate and ammonia in solution.

18. A system as claimed in claim 17, the system further comprising one or more separation units arranged to separate from the slurry the metal carbonate and other insoluble solids and produce a solution comprising ammonia, and to recover ammonia from the slurry for re-use in the elongate hollow tower.

19. A system as claimed in claim 18, wherein the one or more separation units further comprise distillation apparatus that is arranged for distilling off ammonia present in the slurry that comprises the metal carbonate and other insoluble solids and the system further comprises a condenser in which the ammonia along with water distilled off in the distillation apparatus are condensed to form an ammonia-in-water solution, the condenser being further arranged such that the ammonia-in-water solution is able to be recycled for re-use in the elongate hollow tower.

\* \* \* \* \*